(12) United States Patent
Waragai et al.

(10) Patent No.: US 6,299,133 B2
(45) Date of Patent: Oct. 9, 2001

(54) GATE VALVE

(75) Inventors: Kenji Waragai, Ibaraki-ken; Tsuneo Ishigaki, Saitama-ken, both of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/741,180

(22) Filed: Dec. 21, 2000

(30) Foreign Application Priority Data

Dec. 21, 1999 (JP) .................................................. 11-363062

(51) Int. Cl.[7] .................................................. F16K 25/00
(52) U.S. Cl. .......................... 251/193; 251/250; 251/62; 251/326
(58) Field of Search .................................. 251/193, 194, 251/250, 202, 200, 199, 196, 195, 62, 326

(56) References Cited

U.S. PATENT DOCUMENTS

| | | | |
|---|---|---|---|
| 1,577,964 | * | 3/1926 | Gilbert . |
| 4,018,420 | * | 4/1977 | Muller et al. ........................ 251/172 |
| 4,275,866 | * | 6/1981 | Jamar .................................. 251/250 |
| 5,415,376 | | 5/1995 | Ito ....................................... 251/158 |
| 5,641,149 | | 6/1997 | Ito ....................................... 251/158 |

FOREIGN PATENT DOCUMENTS 2613171    2/1997   (JP) .

* cited by examiner

Primary Examiner—Kevin Shaver
Assistant Examiner—D A Bonderer
(74) Attorney, Agent, or Firm—Paul A. Guss (57) ABSTRACT

A gate valve comprises a valve rod for making displacement in accordance with a driving action of a cylinder mechanism; a guide shaft for guiding the valve rod; a valve disk for opening/closing a passage in accordance with a displacement action of the valve rod; a rack connected to the valve rod, for making displacement integrally with the valve rod; a pinion rotatably supported by a casing, for meshing with the rack; and a pillow member connected to the valve disk and formed with a male thread for making engagement with a female thread formed on an inner circumferential surface of the pinion.

11 Claims, 10 Drawing Sheets

GATE VALVE

BACKGROUND OF THE INVENTION

1. Field of the Invention

The present invention relates to a gate valve which is capable of opening/closing, for example, a flow passage or a discharge passage, for example, for a pressure fluid or a gas.

2. Description of the Related Art

The operation has been hitherto performed, for example, for processing apparatuses for semiconductor wafers, liquid crystal substrates or the like, in which the semiconductor wafer, the liquid crystal substrate or the like is put in and out of various processing chambers through a passage. A gate valve for opening/closing the passage is provided for the passage.

Such a gate valve is arranged as follows, for example. as described in Japanese Patent No. 2613171. That is, a valve disk arrives at a position opposed to a valve seat in accordance with rectilinear motion of a valve rod which is displaceable in accordance with the driving action of a cylinder. After that, the valve disk is pressed against the valve seat, and it is seated thereon by the aid of the tilting motion of the valve rod. Accordingly, a passage, which is formed through a valve box, is closed.

Figure 8:
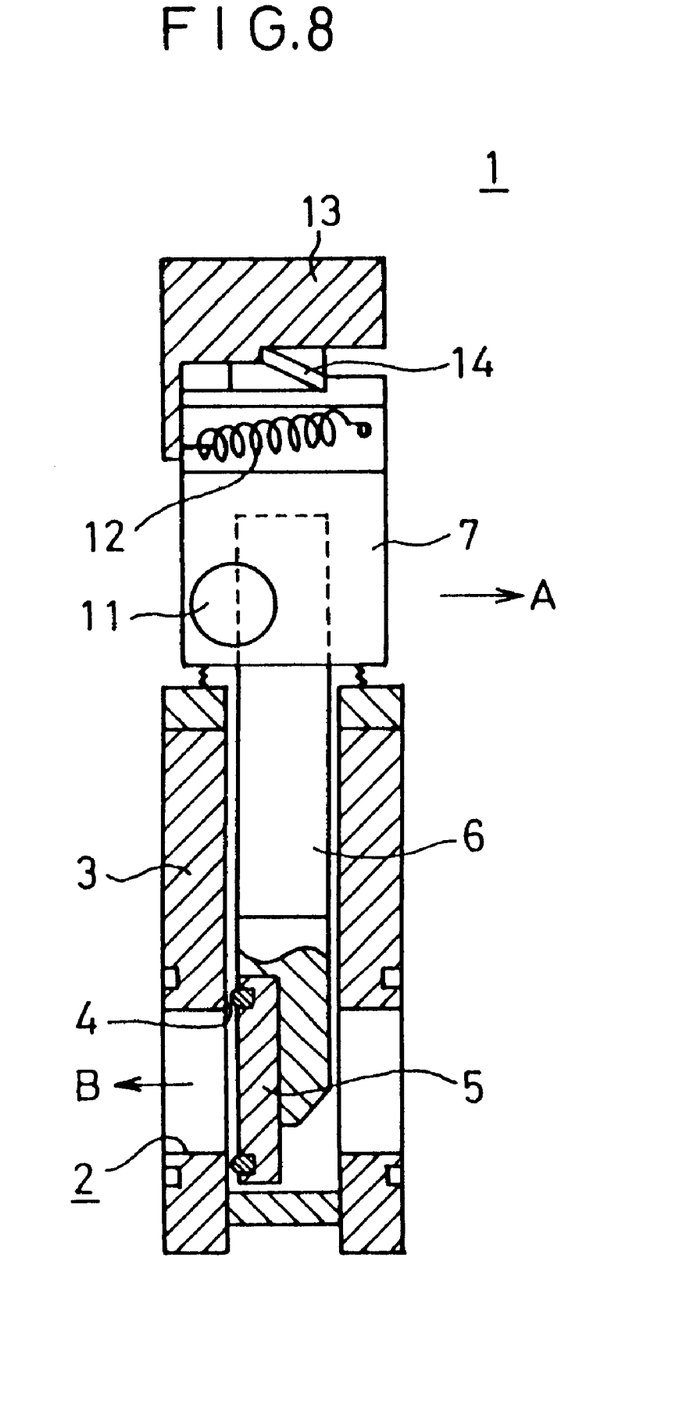
FIG. 8 shows a vertical sectional view taken in an axial direction, illustrating a gate valve concerning the conventional technique.
Figure 9:
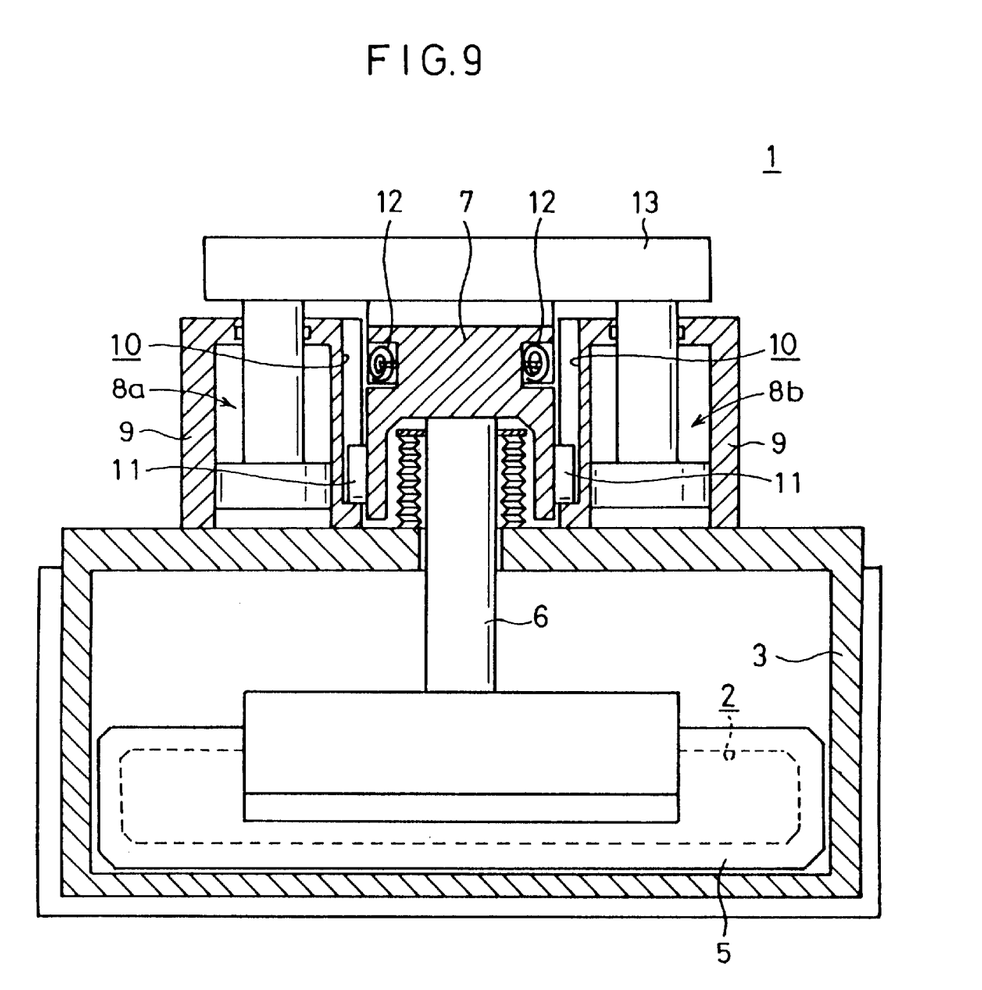
FIG. 9 shows a vertical sectional view taken in the axial direction, illustrating the gate valve concerning the conventional technique.

That is, as shown in FIGS. 8 and 9, the gate valve 1 concerning the conventional technique comprises a valve box 3 which is formed with a passage 2 for putting in and out a workpiece, a valve disk 5 for closing the passage 2 by being seated on a valve seat 4 formed in the valve box 3, and a valve rod 6 which is connected to the valve disk 5 and which is provided to be tiltable and movable upwardly and downwardly.

Figure 10:
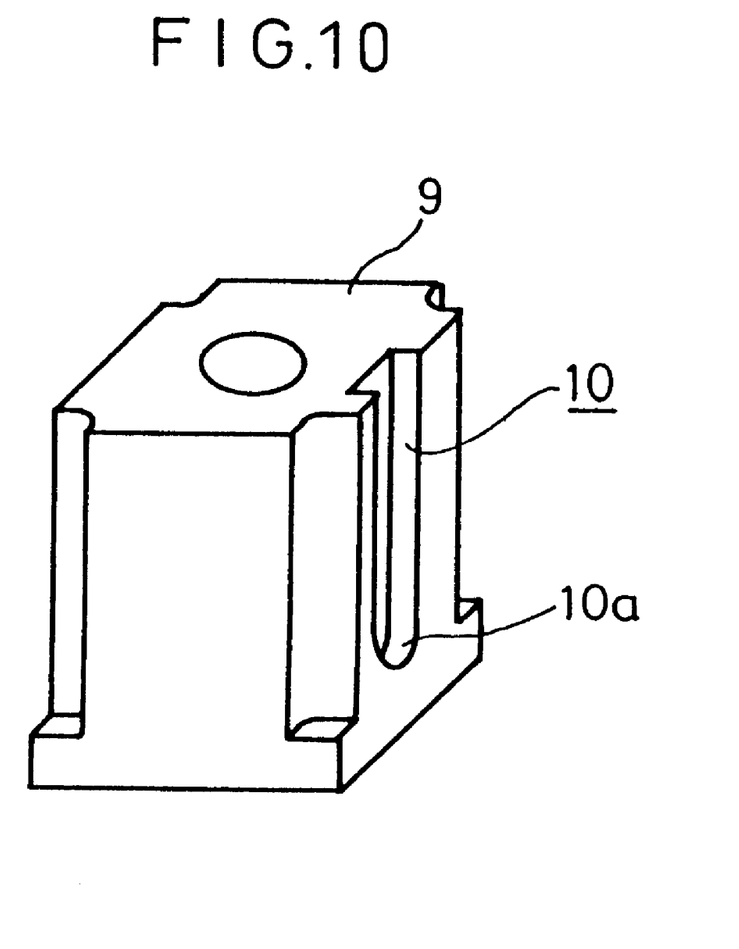
FIG. 10 shows a perspective view illustrating a cylinder tube which constitutes the gate valve concerning the conventional technique.

A block 7 is connected to an upper portion of the valve rod 6. Pivotal shafts 11, which are displaceable along guide grooves 10 (see FIG. 10) formed on both side surfaces of cylinder tubes 9 of a pair of cylinders 8a, 8b respectively, are secured to both side surfaces of the block 7. The block 7 is provided to be tiltable and movable upwardly and downwardly in accordance with the guiding action of the guide grooves 10 with which the pivotal shafts 11 are engaged. Each of the cylinder tube 9, the block 7, and the pivotal shaft 11 is made of a metal material.

In other words, the block 7 makes rectilinear motion in the vertical direction integrally with a yoke 13 by the aid of tensile springs 12 in accordance with the guiding action of the guide grooves 10 with which the pivotal shafts 11 are engaged. The block 7 makes the tilting motion in the direction of the arrow A about support points of the pivotal shafts 11 which are supported by curved lower ends 10a (see FIG. 10) of the guide grooves 10. Therefore, the valve disk 5 is tilted in the direction of the arrow B about the support points of the pivotal shafts 11, and it is seated on the valve seat 4. Thus, the passage 2 is closed in an air-tight manner.

Reference numeral 14 indicates a plate-shaped cam having a rhombic cross section. The inclined plate-shaped cam 14 is displaced substantially horizontally, and thus the block 7 is tilted in the direction of the arrow A about the support points of the lower ends 10a of the guide grooves 10.

However, the gate valve 1 concerning the conventional technique described above is arranged such that the valve rod 6 makes the vertical movement and the tilting movement in accordance with the driving action of the pair of cylinders 8a, 8b, and the passage 2 is closed by the valve disk 5 which is connected to the valve rod 6. Therefore, in the case of the gate valve 1 concerning the conventional technique, it is feared that when the gate valve 1 is used for many years, the sealing performance for the passage 2 is deteriorated when the valve disk 5 is seated on the valve seat 4 to close the passage 2.

SUMMARY OF THE INVENTION

A general object of the present invention is to provide a gate valve which makes it possible to avoid generation of dust or the like due to abrasion, by allowing a valve disk to press and seal a valve seat of a valve box in a substantially perpendicular direction.

A principal object of the present invention is to provide a gate valve which makes it possible to improve the sealing performance for a passage by reliably sealing the passage of a valve box with a valve disk.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
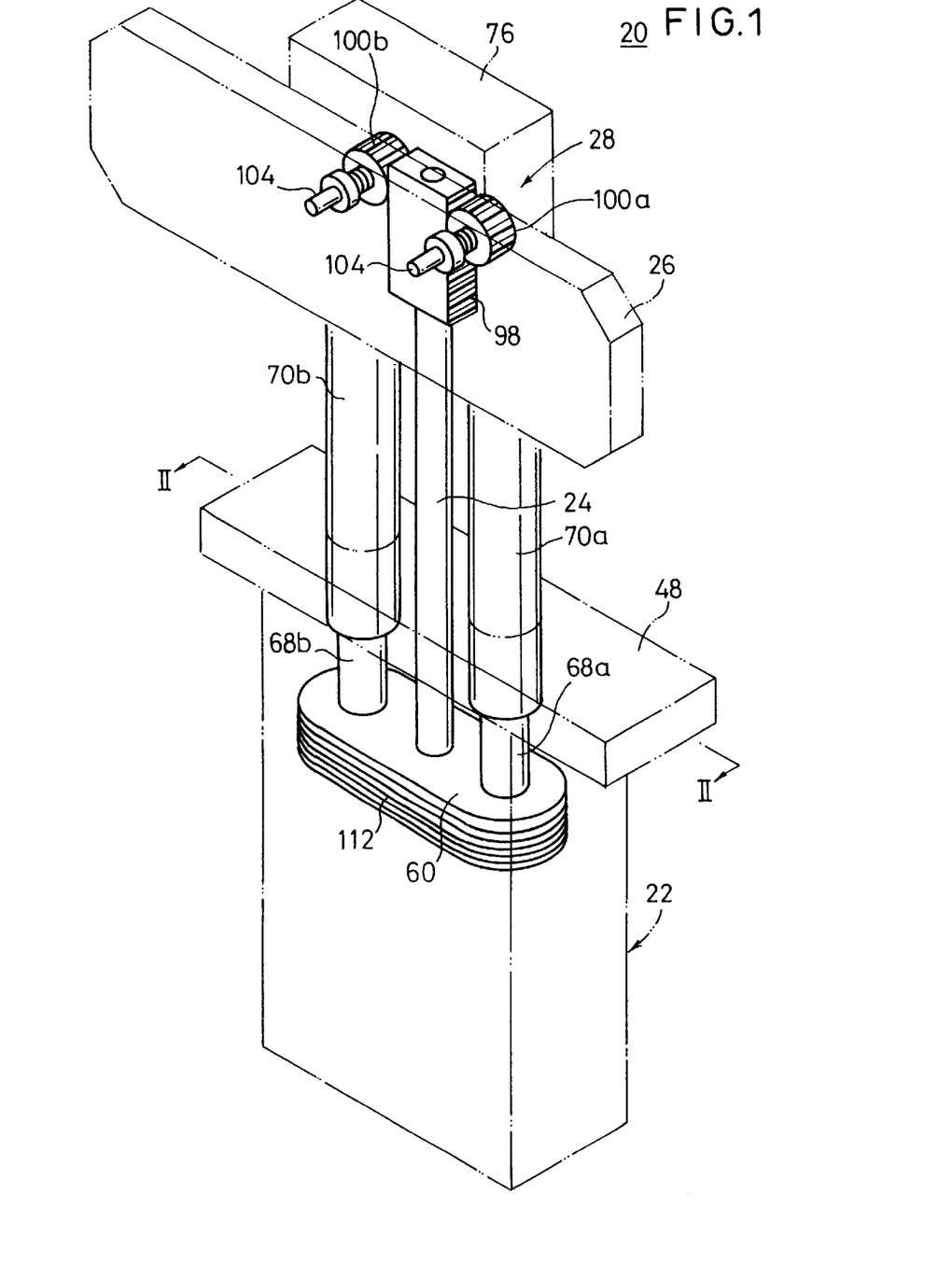
FIG. 1 shows a schematic perspective view illustrating a gate valve according to an embodiment of the present invention.

In FIG. 1, reference numeral 20 indicates a gate valve according to an embodiment of the present invention.

The gate valve 20 comprises a driving section 22, a valve rod 24 which is displaceable in the vertical direction in accordance with the driving action of the driving section 22, a valve disk 26 for opening/closing a passage (as described later on) in accordance with the displacement action of the valve rod 24, and a displacement mechanism 28 which is provided between the valve rod 24 and the valve disk 26, for making back and forth movement of the valve disk 26 toward the passage.

A valve box 30 is interconnected to an upper portion of the driving section 22 by the aid of screw members. The passage 32 for making communication between the atmospheric air and a vacuum chamber is provided for the valve box 30 (see FIG. 30). The valve disk 26 is seated on a valve seat 34 which is formed on an inner wall surface of the valve box 30, and thus the passage 32 is closed in an air-tight manner. A seal member 36 is installed to the valve disk 26 along an annular groove. The air-tightness, which is obtained when the valve disk 26 is seated on the valve seat 34, is maintained by the seal member 36.

Figure 2:
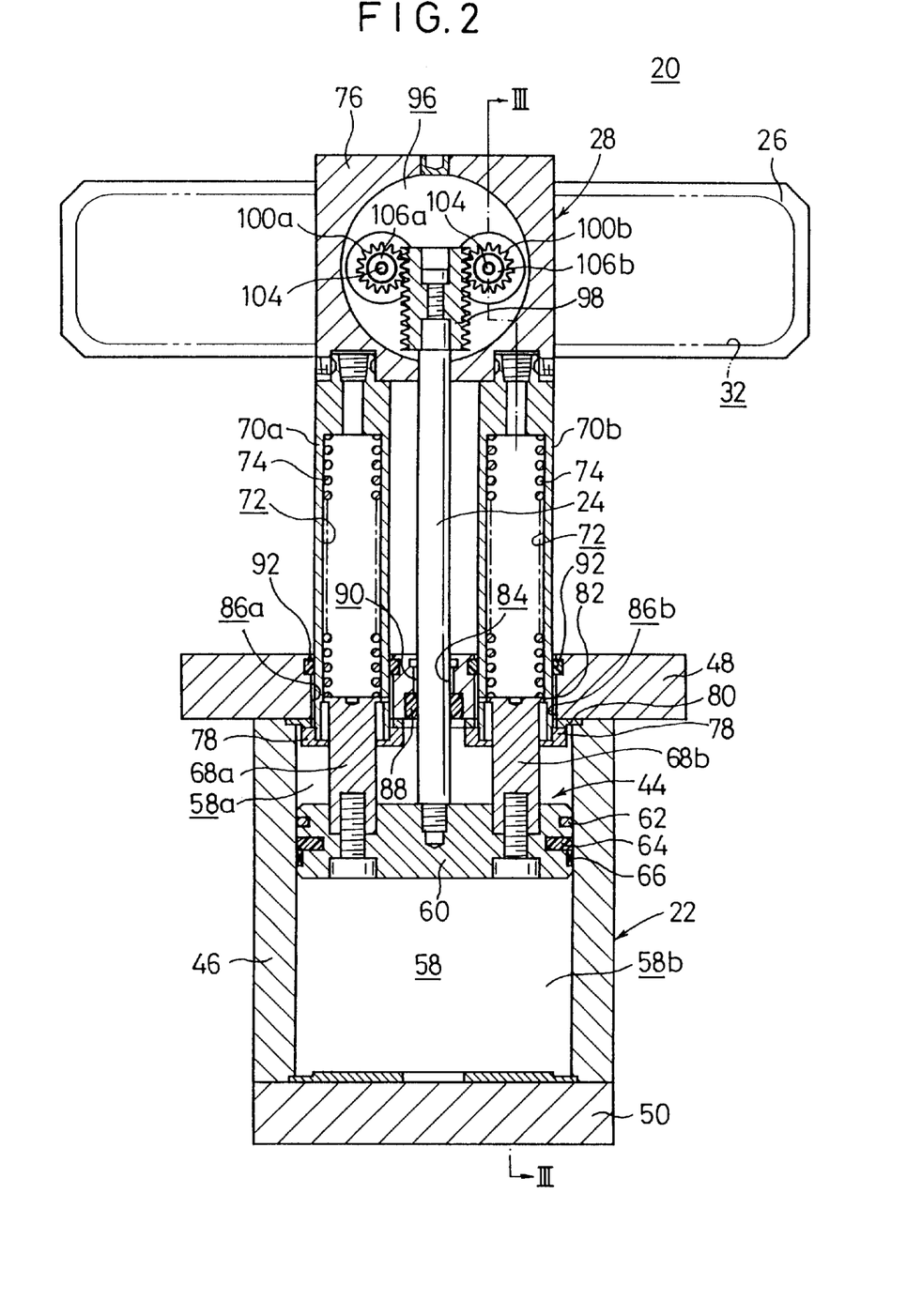
FIG. 2 shows a vertical sectional view taken along a line II—II shown in FIG. 1.
Figure 3:
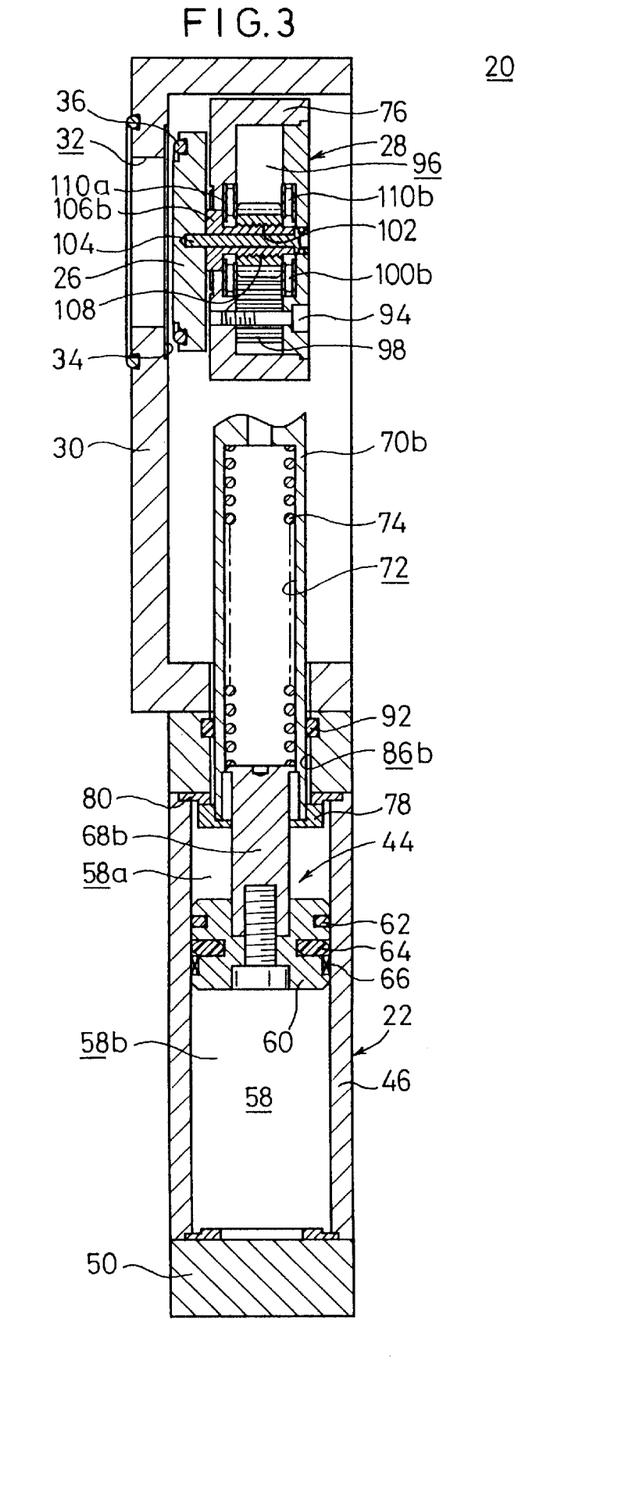
FIG. 3 shows, with partial omission, a vertical sectional view taken along a line III—III shown in FIG. 2.

As shown in FIGS. 2 and 3, the driving section 22 is composed of a cylinder mechanism (driving mechanism) 44. The cylinder mechanism 44 comprises a cylinder tube 46 which is formed to have a cylindrical configuration, a rod cover 48 which is connected to a first end of the cylinder tube 46, and a head cover 50 which is connected to a second end of the cylinder tube 46. Two stripes of sensor attachment long grooves 52a, 52b, which are substantially parallel to one another and which extend in the axial direction, are formed on an outer wall surface of the cylinder tube 46 (see FIG. 4). A pair of unillustrated sensors for detecting the position of a piston as described later on are installed to the sensor attachment long grooves 52a, 52b.

Figure 4:
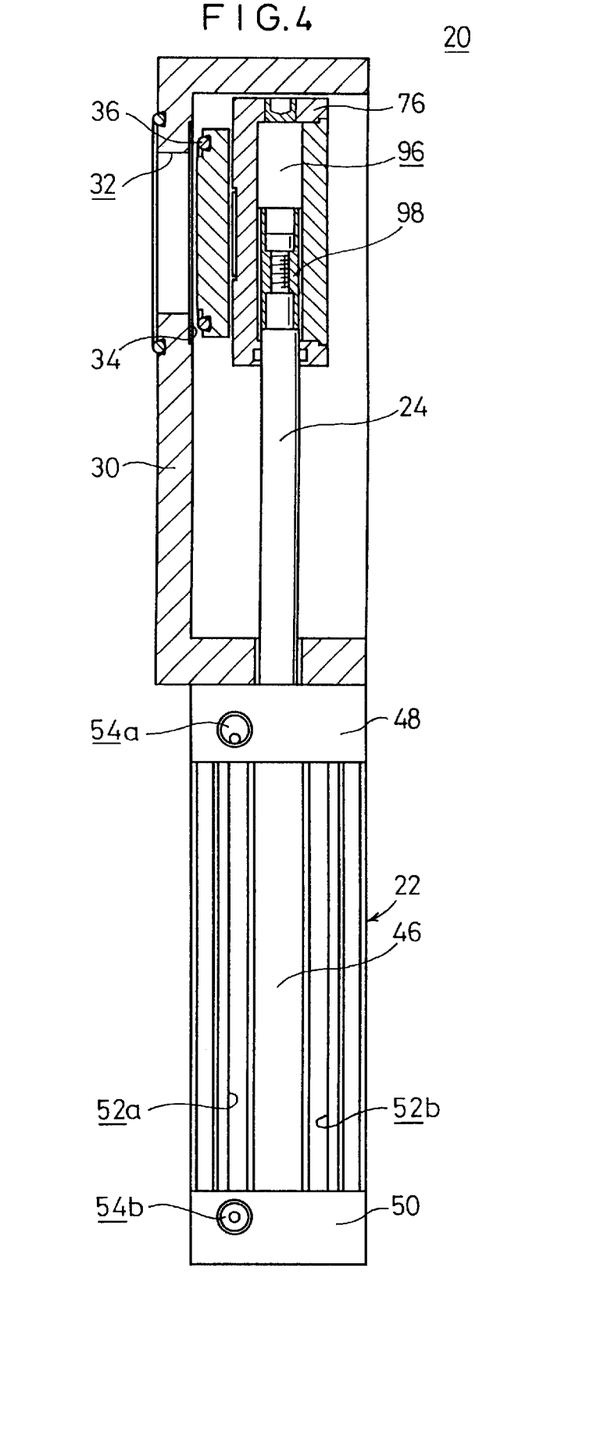
FIG. 4 shows a partial vertical sectional view taken in an axial direction in FIG. 2.

As shown in FIG. 4, a pair of pressure fluid inlet/outlet ports 54a, 54b, which communicate with an upper cylinder chamber and a lower cylinder chamber respectively as described later on, are formed on the rod cover 48 and the head cover 50 respectively.

As shown in FIG. 2, the cylinder mechanism 44 comprises the piston 60 which is accommodated displaceably along a cylinder chamber 58 in the cylinder tube 46, and the valve rod 24 which has its first end connected to the piston 60 and its second end connected to the displacement mechanism 28.

Those installed to the piston 60 include a piston packing 62 which maintains the air-tightness for the upper cylinder chamber 58a and the lower cylinder chamber 58b divided into two by the piston 60 respectively, a wear ring 64 which makes sliding movement along an inner wall surface of the cylinder tube 46, and an annular magnet 66. The annular magnet 66 is displaceable integrally with the piston 60. The position of the piston 60 is detected by sensing the magnetism of the magnet 66 by using the unillustrated sensors attached to the sensor attachment long grooves 52a, 52b.

A pair of rod members 68a, 68b are connected to the piston 60 so that the pair of rod members 68a, 68b are substantially parallel to the valve rod 24. First ends of the rod members 68a, 68b are inserted into holes 72 of guide shafts 70a, 70b. Spring members 74 are arranged in the holes 72 of the guide shafts 70a, 70b. The rod members 68a, 68b are always in a state of being pressed toward the piston 60 (in the downward direction) by means of the resilient force of the spring members 74. Therefore, the rod members 68a, 68b are provided to be displaceable along the holes 72 against the resilient force of the spring members 74.

First ends of the guide shafts 70a, 70b are connected to a casing (block member) 76 which constitutes the displacement mechanism 28. Stoppers 78, each of which is formed with an annular expansion protruding radially outwardly, are connected to second ends disposed on the opposite side. In this arrangement, the stoppers 78 abut against plate-shaped buffer members 80 which are secured to the rod cover 48 to regulate the displacement of the guide shafts 70a, 70b. Annular fastening sections 82, which are formed at first ends of the rod members 68a, 68b, abut against inner circumferential projections of the stoppers 78. Accordingly, a function is effected such that the rod members 68a, 68b are prevented from disengagement from the guide shafts 70a, 70b.

A first through-hole 84 having a small diameter, through which the valve rod 24 is inserted, is formed at a substantially central portion of the rod cover 48. A pair of second through-holes 86a, 86b, through which the pair of guide shafts 70a, 70b are inserted respectively, are formed through the rod cover 48, while the first through-hole 84 is interposed therebetween.

A seal member 88, which maintains the air-tightness of the cylinder chamber 58 by surrounding the outer circumferential surface of the valve rod 24, is installed to the inner circumferential surface of the first through-hole 84. An annular recess 90, which functions as a relief groove for the lubricating oil applied to the outer circumferential surface of the valve rod 24, is formed on the inner circumferential surface.

A guide ring 92, which surrounds the outer circumferential surface of the guide shaft 70a, 70b, is installed to an annular groove on the inner circumferential surface of the second through-hole 86a, 86b. The guide ring 92 is provided to have both of the sealing function to maintain the air-tightness of the cylinder chamber 58 and the guide function to linearly displace the guide shaft 70a, 70b.

The displacement mechanism 28 has the casing 76 which is connected to the first ends of the pair of guide shafts 70a, 70b respectively and which is displaceable in the axial direction integrally with the pair of guide shafts 70a, 70b. The casing 76 comprises a housing and a cover member which are fixed by screw members 94 (see FIG. 3). A chamber 96 having a substantially circular cross section is formed at the inside of the casing 76. The first end of the valve rod 24 is provided to be insertable into the interior of the chamber 96.

As shown in FIGS. 2 and 3, a rack 98 is connected to the first end of the valve rod 24 by the aid of a screw member. A pair of teeth, which are formed substantially in parallel to one another, are formed at mutually opposing side portions of the rack 98. A first pinion 100a and a second pinion 100b, which have teeth meshed with the pair of teeth of the rack 98 respectively, are rotatably supported by the casing 76 respectively. Female threads 102 are formed on inner circumferential surfaces of the first pinion 100a and the second pinion 100b respectively (see FIG. 3).

A pair of pillow members 106a, 106b are connected to the valve disk 26 in a substantially perpendicular direction respectively by the aid of screw members 104. Male threads 108, which are engaged with the female threads 102 formed on the inner circumferential surfaces of the first pinion 100a and the second pinion 100b respectively, are formed on the pair of pillow members 106a, 106b. The respective pillow members 106a, 106b are rotatably supported by a pair of bearing members 110a, 110b. The bearing members 110a, 110b are provided with a plurality of rollers which are arranged in an annular configuration.

The male threads 108, which are formed on the pair of pillow members 106a, 106b, are formed to be a right-handed screw and a left-handed screw having opposite threading directions corresponding to the female threads 102 of the first pinion 100a and the second pinion 100b.

In the displacement mechanism 28, the rack 98 is moved upwardly integrally with the valve rod 24. Accordingly, the teeth of the rack 98 are meshed with the teeth of the first pinion 100a and the second pinion 100b respectively. The first pinion 100a and the second pinion 100b are rotated in mutually opposite directions. When the first pinion 100*a* and the second pinion 100*b* are rotated respectively, the pillow members 106*a*, 106*b* protrude toward the passage 32 in accordance with the engaging action between the female threads 102 of the first pinion 100*a* and the second pinion 100*b* and the male threads 108 of the pillow members 106*a*, 106*b*. Therefore, the valve disk 26, which is connected to the pair of pillow members 106*a*, 106*b*, is displaced in the substantially horizontal direction toward the passage 32. The seal member 36 is seated on the valve seat 34, and thus the passage 32 is closed.

In this arrangement, the following advantage is obtained concerning the displacement mechanism 28. That is, when the valve disk 26 is displaced in the direction (substantially horizontal direction) substantially perpendicular to the axis of the valve rod 24, then no unbalanced load is applied to the valve rod 24, and the valve disk 26 can be displaced by equivalently rotating the pair of first pinion 100*a* and the second pinion 100*b*.

Figure 5:
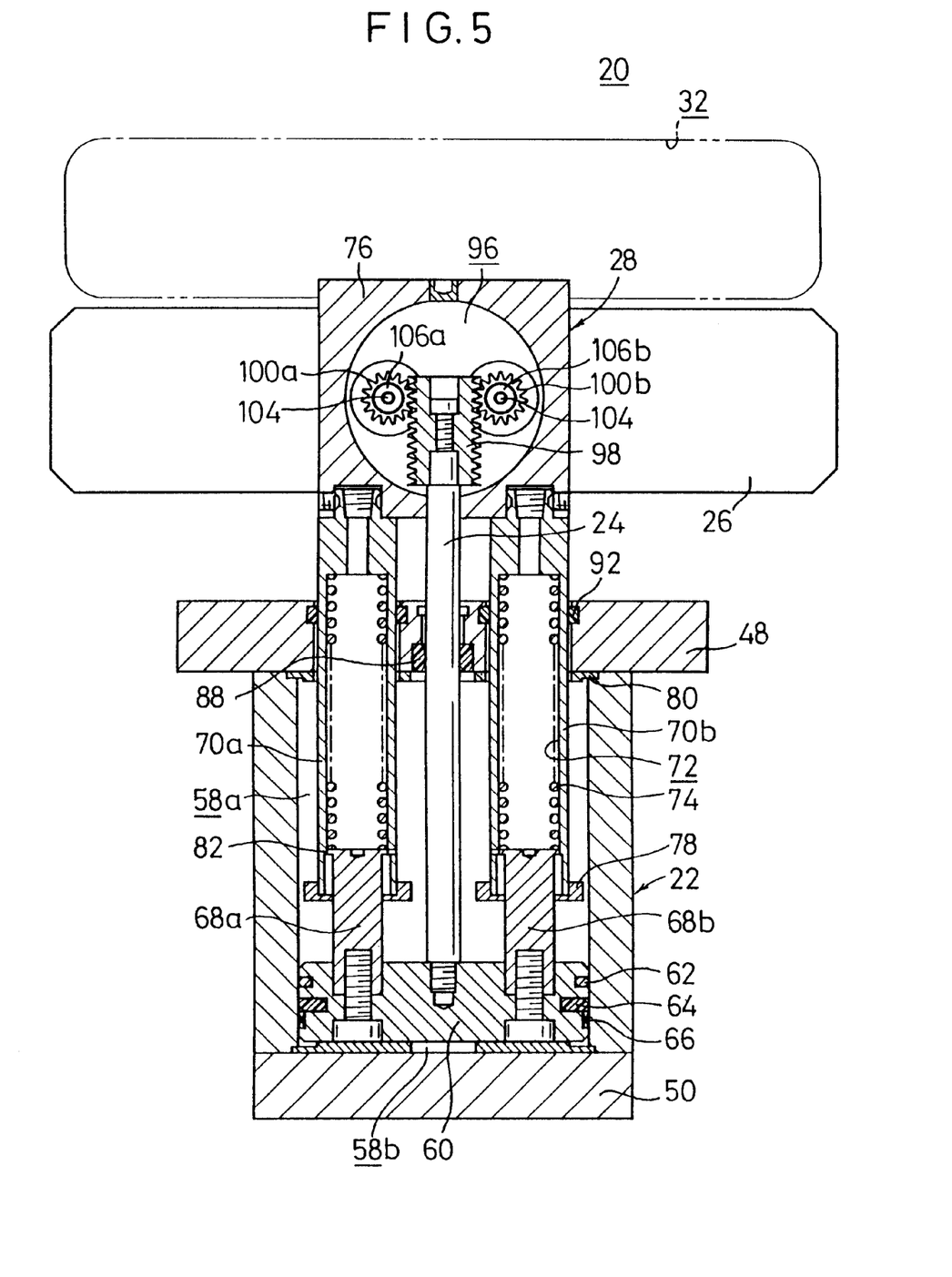
FIG. 5 shows a vertical sectional view illustrating a state of the initial position in which a piston is at the bottom dead center.

The gate valve 20 according to the embodiment of the present invention is basically constructed as described above. Next, its operation, function, and effect will be explained. The following explanation will be made assuming that the initial position resides in the open state in which the piston 60 is located at the lowermost end position (bottom dead center) of the cylinder chamber 58, and the passage 32, which is formed through the valve box 32, is not closed by the valve disk 26 as shown in FIG. 5.

At the initial position, a pressure fluid (for example, compressed air) is supplied from a pressure fluid supply source (not shown) via the pressure fluid inlet/outlet port 54*b* to the lower cylinder chamber 58*b*. The piston 60 is moved upwardly in accordance with the action of the pressure fluid supplied to the lower cylinder chamber 58*b*. The valve rod 24, which is connected to the piston 60, is moved upwardly in an integrated manner as well. In this situation, it is assumed that the upper cylinder chamber 58*a* is in a state of being open to the atmospheric air in accordance with the action of an unillustrated directional control valve.

When the valve rod 24 is moved upwardly, the pair of rod members 68*a*, 68*b*, the guide shafts 70*a*, 70*b*, the displacement mechanism 28, and the valve disk 26 are moved upwardly in an integrated manner together with the valve rod 24. In this arrangement, the spring force of the spring member 74, which is arranged in each of the holes 72 of the guide shafts 70*a*, 70*b*, is set to have a predetermined value. Accordingly, the guide shafts 70*a*, 70*b* and the rod members 68*a*, 68*b* connected to the piston 60 are moved upwardly together. In other words, the displacement of the rod members 68*a*, 68*b* does not overcome the resilient force of the spring members 74 during the period ranging from the initial position shown in FIG. 5 to the state shown in FIG. 2 in which the valve disk 26 is opposed to the passage 32. The rod members 68*a*, 68*b* and the guide shafts 70*a*, 70*b* are displaced in the integrated manner.

When the pair of guide shafts 70*a*, 70*b* are moved upwardly, the pair of guide shafts 70*a*, 70*b* are supported by the guide rings 92 respectively. Accordingly, the linear accuracy is maintained for the valve rod 24 which is arranged between the pair of guide shafts 70*a*, 70*b*.

When the guide shafts 70*a*, 70*b* are moved upwardly together with the valve rod 24, the stoppers 78, which are provided at the first ends of the guide shafts 70*a*, 70*b*, abut against the buffer members 80 secured to the rod cover 48. Accordingly, the displacement action of the pair of guide shafts 70*a*, 70*b* is regulated (see FIG. 2). Therefore, the displacement mechanism 28 and the valve disk 26, which are connected to the ends of the pair of guide shafts 70*a*, 70*b*, also stand still, giving a state in which the valve disk 26 is opposed to the passage 32 of the valve box 30 (see FIG. 30).

Figure 6:
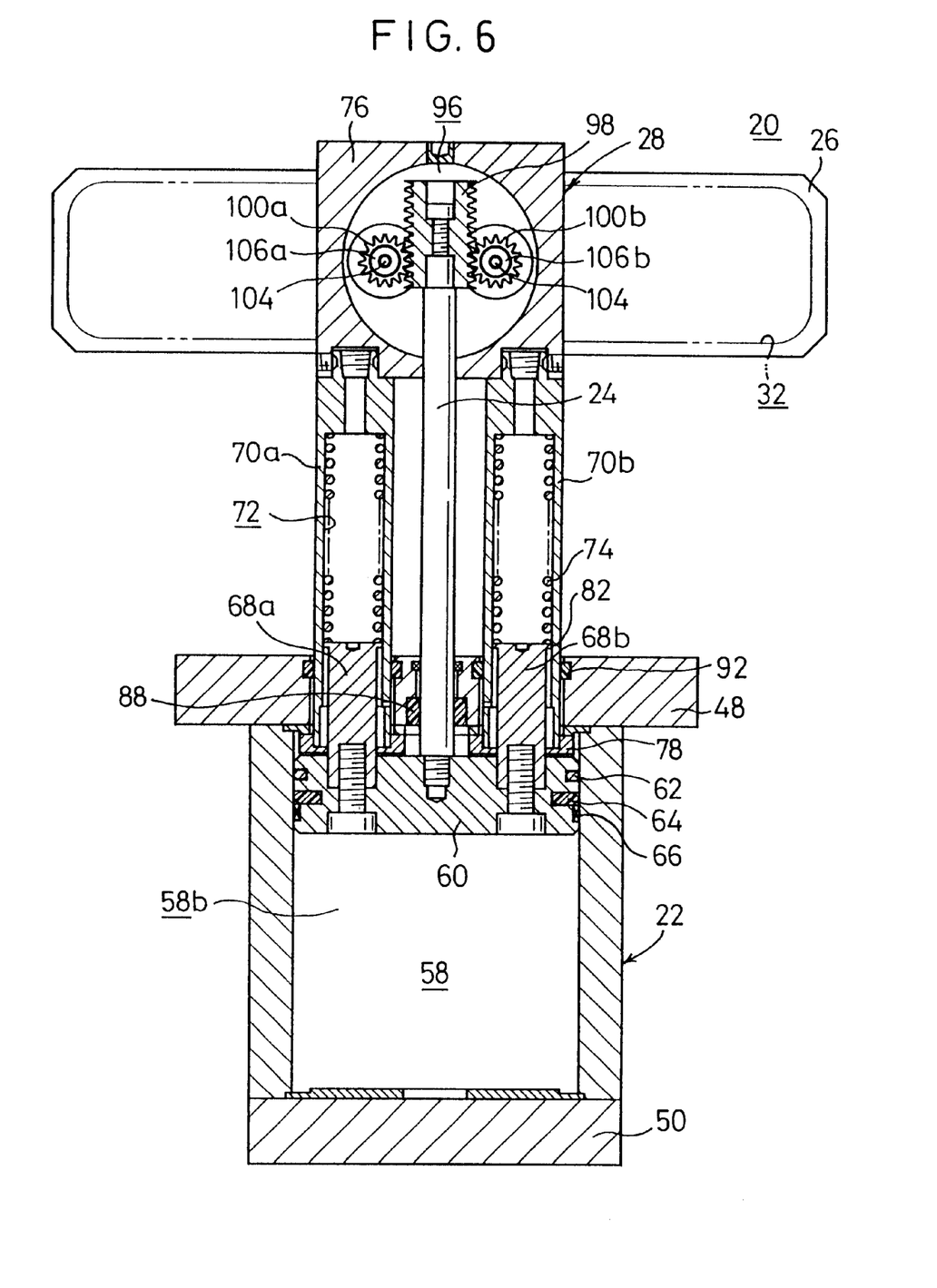
FIG. 6 shows a vertical sectional view illustrating a state in which the piston arrives at the top dead center.
Figure 7:
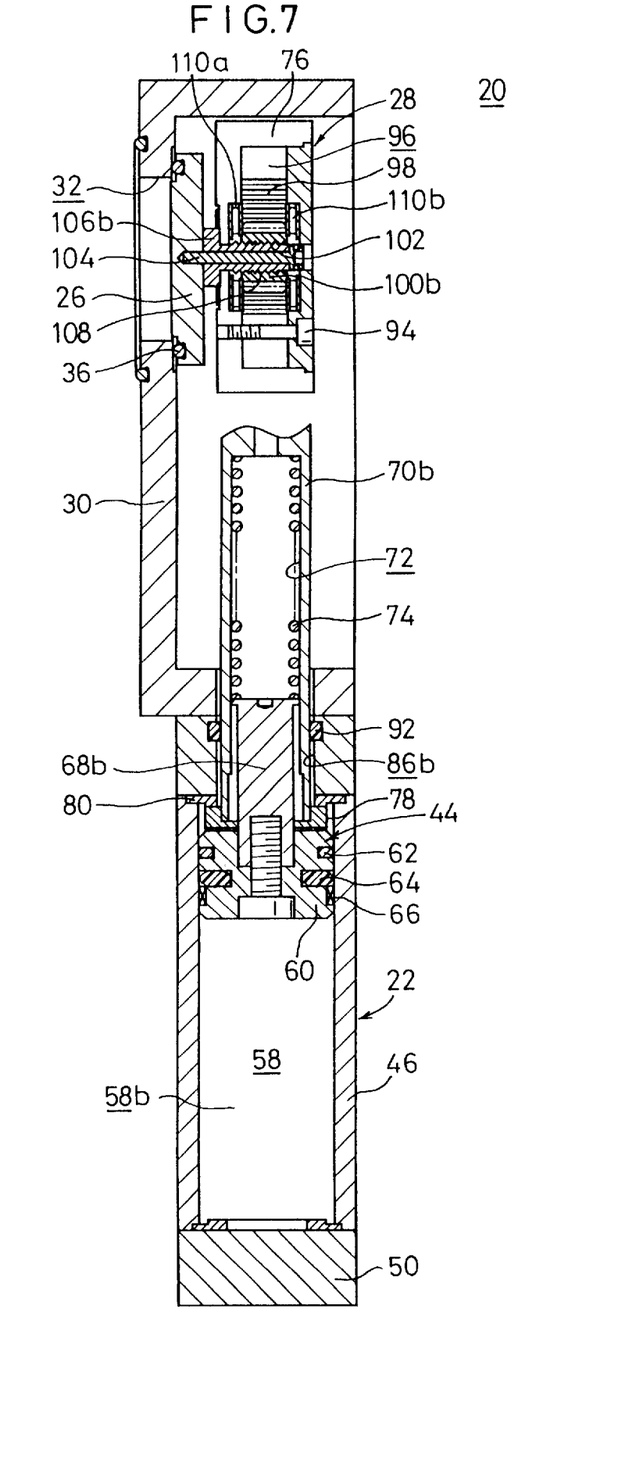
FIG. 7 shows, with partial omission, a vertical sectional view illustrating a state in which a valve disk is displaced in a substantially horizontal direction toward a passage starting from the state shown in FIG. 3.

When the piston 60 is further moved upwardly from the state shown in FIG. 2, the valve rod 24 and the rod members 68*a*, 68*b* which overcome the resilient force of the spring members 74 are integrally moved upwardly to give a state shown in FIG. 6. In this arrangement, only the rod members 68*a*, 68*b* and the valve rod 24 are moved upwardly, while maintaining the state in which the guide shafts 70*a*, 70*b* and the casing 76 stand still in accordance with the fastening action of the stoppers 78.

Therefore, the rack 98, which is connected to the first end of the valve rod 24, is integrally moved upwardly in the state in which the casing 76 of the displacement mechanism 28 stands still. Accordingly, the teeth of the rack 98 are meshed with the teeth of the first pinion 100*a* and the second pinion 100*b* respectively. The first pinion 100*a* and the second pinion 100*b* are rotated in the mutually opposite directions.

When the first pinion 100*a* and the second pinion 100*b* are rotated in the mutually opposite directions, the pillow members 106*a*, 106*b* protrude toward the passage 32 in accordance with the engaging action of the female threads 102 of the first pinion 100*a* and the second pinion 100*b* and the male threads 108 of the pillow members 106*a*, 106*b*. Therefore, the valve disk 26, which is connected to the pair of pillow members 106*a*, 106*b*, is displaced in the substantially horizontal direction. The seal member 36 is seated on the valve seat 36, and thus the passage 32 is closed.

When the seal member 36 of the valve disk 26 is pressed toward the passage 32 in accordance with the urging action of the displacement mechanism 28, the lateral load, which is applied to the valve rod 24, is absorbed by a flat surface section 112 (see FIG. 1) of the piston 60 formed to have a substantially elliptic configuration and the inner wall surface of the cylinder tube 46. The lateral load, which is applied to the pair of guide shafts 70*a*, 70*b* respectively, is absorbed by the guide rings 92 and the wear ring 64. Therefore, it is preferable to apply a low friction treatment to the guide rings 92 and the wear ring 64.

Subsequently, when the valve disk 26 is separated from the valve seat 34 to open the passage 32, the pressure fluid is supplied to the upper cylinder chamber 58*a* in accordance with the switching action of the unillustrated directional control valve. Accordingly, the piston 60, the valve rod 24, the rod members 68*a*, 68*b*, and the rack 98 are moved downwardly in an integrated manner. The lower cylinder chamber 58*b* is in a state of being open to the atmospheric air in accordance with the switching action of the unillustrated directional control valve. In this situation, the first pinion 100*a* and the second pinion 100*b*, which are meshed with the teeth of the rack 98, are rotated in directions opposite to the above. The pillow members 106*a*, 106*b*, which are engaged with the first pinion 100*a* and the second pinion 100*b* respectively, are displaced in a direction opposite to the above. Accordingly, the valve disk 26 is displaced in the direction to make separation from the passage 32 to give the state shown in FIG. 3.

When the piston 60 is moved downwardly, the pair of guide shafts 70*a*, 70*b* are pressed upwardly in accordance with the action of the resilient force of the spring members 74. Therefore, only the valve rod 24 is moved downwardly, and the pair of guide shafts 70*a*, 70*b* are in the state in which their displacement is regulated.

When the pressure fluid is supplied to the upper cylinder chamber 58a to further move the piston 60 downwardly, the valve rod 24, the rod members 68a, 68b, the guide shafts 70a, 70b, the displacement mechanism 28, and the valve disk 26 are moved downwardly in the integrated manner to restore the initial position shown in FIG. 5. When the valve rod 24, which is connected to the piston 60, is moved downwardly, the annular fastening section 82, which is formed at the first end of the rod member 68a, 68b, is engaged with the inner circumferential projection of the stopper 78. Accordingly, the valve rod 24 and the guide shafts 70a, 70b are displaced in the integrated manner.

In the embodiment of the present invention, the displacement mechanism 28, which causes the back and forth movement of the valve disk 26 in the substantially horizontal direction toward the passage 32, is provided at the end of the valve rod 24. Accordingly, the passage 32 is reliably closed by the seal member 36 of the valve disk 26. It is possible to improve the sealing performance for the passage 32. In this case, the seal member 36 of the valve disk 26 is seated in the direction substantially perpendicular to the valve seat 34. Therefore, no slippage occurs when the seal member 36 is seated, and it is possible to avoid any generation of dust or the like. As a result, it is possible to maintain the cleanness in the valve box 30.

In the embodiment of the present invention, the valve disk 26 is allowed to make the back and forth movement toward the passage 32 in accordance with the urging action of the displacement mechanism 28 to seat the seal member 36 on the valve seat 34. Accordingly, the valve rod 24 merely performs the reciprocating rectilinear motion without making any tilting movement. Therefore, it is possible to decrease the load applied to the cylinder mechanism 44, and it is possible to improve the durability of the cylinder mechanism 44.

The lateral load, which is applied to the valve rod 24 when the passage 32 is closed by the valve disk 26, is appropriately absorbed by the flat surface section 112 of the piston 60 formed to have the substantially elliptic configuration and the inner wall surface of the cylinder tube 46. Therefore, it is possible to decrease the load applied to the cylinder mechanism 44, and it is possible to further improve the durability. It is unnecessary to specially add any constitutive member for absorbing the lateral load. Thus, it is possible to reduce the number of parts, and it is possible to decrease the production cost.

What is claimed is:

1. A gate valve comprising:
   a driving mechanism;
   a valve rod for making displacement in accordance with a driving action of said driving mechanism;
   a guide shaft for guiding said valve rod;
   a valve disk for opening/closing a passage formed through a valve box in accordance with a displacement action of said valve rod; and
   a displacement mechanism provided with a block member connected to said guide shaft, for displacing said valve disk in a direction substantially perpendicular to an axis of said valve rod, wherein:
   said displacement mechanism includes a rack member connected to said valve rod, for making displacement integrally with said valve rod; a pinion rotatably supported by said block member, for meshing with said rack member; and a pillow member connected to said valve disk and formed with a male thread to be engaged with a female thread formed on an inner circumferential surface of said pinion.

2. The gate valve according to claim 1, wherein a stopper for regulating displacement of said guide shaft is provided at one end of said guide shaft.

3. The gate valve according to claim 2, further comprising a rod member connected to a piston; and a spring member arranged in a hole of said guide shaft, for pressing said rod member toward said piston; wherein said rod member is displaceable integrally with said valve rod against resilient force of said spring member when said displacement of said guide shaft is regulated in accordance with a fastening action of said stopper.

4. The gate valve according to claim 3, wherein a pair of said rod members are provided on both sides while said valve rod connected to a substantially central portion of said piston intervenes therebetween.

5. The gate valve according to claim 1, wherein said driving mechanism is composed of a cylinder mechanism provided with a piston for making reciprocating movement along a cylinder tube, and said piston is formed to have a substantially elliptic configuration.

6. The gate valve according to claim 5, wherein said piston, which is formed to have substantially elliptic configuration, is provided with a flat surface section for absorbing lateral load applied to said valve rod by making contact with an inner wall surface of said cylinder tube.

7. The gate valve according to claim 6, wherein a wear ring for absorbing lateral load applied to said guide shaft is installed to said piston.

8. The gate valve according to claim 5, wherein a rod cover is provided at one end of said cylinder tube; and a guide ring for absorbing lateral load applied to said guide shaft is installed to a through-hole of said rod cover for inserting said guide shaft therethrough.

9. The gate valve according to claim 1, wherein a pair of said guide shafts are provided while said valve rod intervenes therebetween.

10. The gate valve according to claim 1, wherein a pair of substantially parallel teeth are formed at mutually opposing side portions of said rack member, and said pinion includes a first pinion and a second pinion meshed with said pair of teeth of said rack member respectively.

11. The gate valve according to claim 10, wherein a pair of said pillow members have said male threads which are set to provide a right-handed screw and a left-handed screw with mutually opposite threading directions corresponding to said female threads of said first pinion and said second pinion respectively.

* * * * *